United States Patent [19]

Coates

[11] 3,804,065

[45] Apr. 16, 1974

[54] AIRPLANE ANIMAL ENCLOSURE

[75] Inventor: Harvey W. Coates, Scarsdale, N.Y.

[73] Assignee: J. D. Smith Inter Ocean Inc., New York, N.Y.

[22] Filed: July 25, 1972

[21] Appl. No.: 274,858

[52] U.S. Cl................................... 119/11, 119/20
[51] Int. Cl............................................. A01k 1/02
[58] Field of Search............ 119/11, 7, 8, 20, 27, 28

[56] References Cited
UNITED STATES PATENTS

| 329,716 | 11/1885 | Chamberlin | 119/11 |
| 3,626,903 | 12/1971 | Gilst | 119/20 |
| 2,581,318 | 1/1952 | Bartlett | 119/20 |
| 2,081,334 | 5/1937 | Kickenbush | 119/27 X |
| 1,824,225 | 9/1931 | Mitchell | 119/11 X |
| 1,455,006 | 5/1923 | Koon | 119/11 |

Primary Examiner—Russell R. Kinsey
Assistant Examiner—J. N. Eskovitz
Attorney, Agent, or Firm—Stephen E. Feldman

[57] ABSTRACT

A pen enclosure for use in holding animals while they are being shipped by air. The pen comprises individual gates which are removably joined together to form enclosed areas throughout the fuselage of an aircraft without the gates themselves being connected to the aircraft. The pens are generally rectangular in shape but may vary depending on the shape of the plane. The individual gates which form the enclosures have horizontal bars which are positioned close together at the bottom and further apart at the top. This prevents smaller animals from escaping from the bottom while reducing the overall weight of the gates because of the lack of bars at the top. Also, to further reduce the weight of the pens, they do not have tops; the roof of the plane serves as the top of the pens. However, to prevent the animals from contacting the roof of the plane, a group of animals are loaded into each pen and the animals in the pen are packed together so closely that they cannot be jostled about sufficiently to contact the roof of the plane during flight.

3 Claims, 9 Drawing Figures

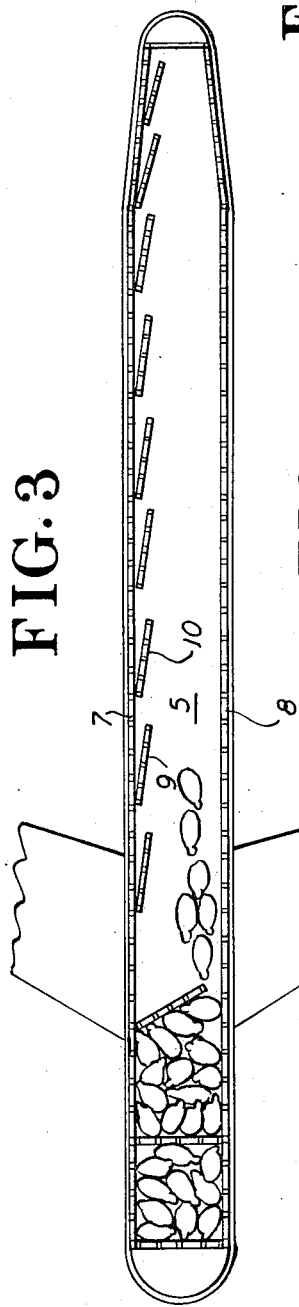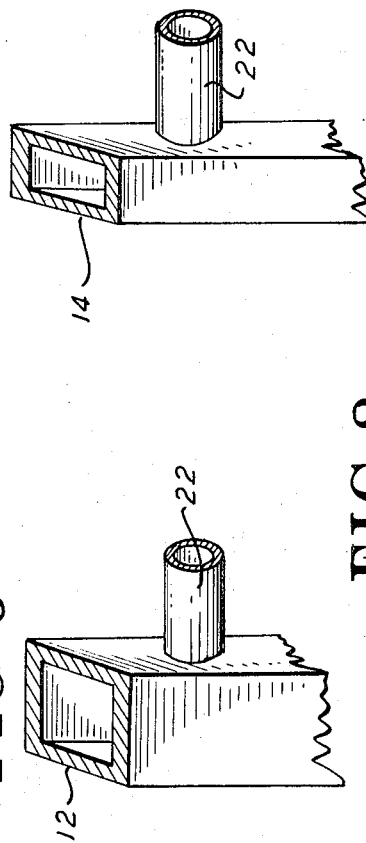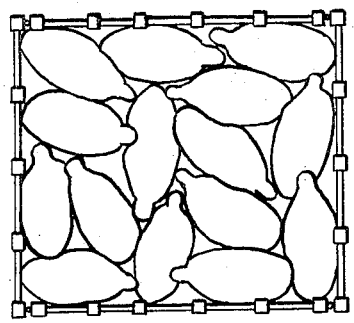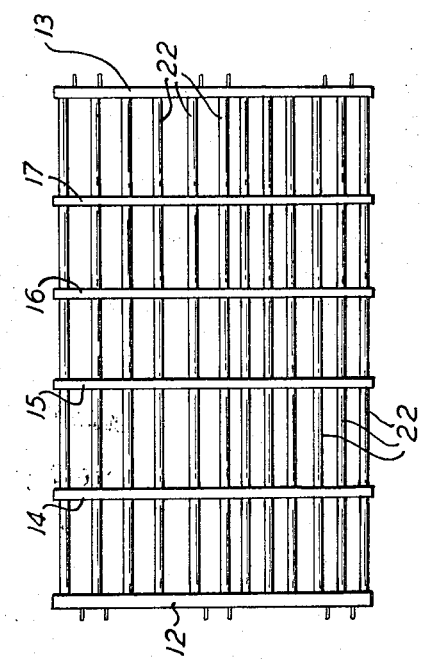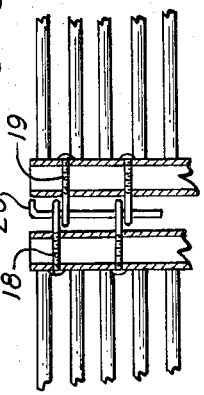

AIRPLANE ANIMAL ENCLOSURE

BACKGROUND OF THE INVENTION

With the need for shipping animals as quickly and efficiently as possible, the use of airplanes for this purpose has become increasingly more popular. However, up until now the problem of damage or death to the animals during shipment was so great as to more than overcome any advantage in shipping the animals by air. The animals were not constrained properly and would tend to be jostled about and injured during the plane flight. There were attempts to constrain the animals in various ways but these never worked satisfactorily. There were attempts to tie down each animal separately but this proved too cumbersome to be workable.

Moreover, the gates that were used did not properly protect the aircraft from the animals, so that very often the jostling about of the animals resulted in damage to the aircraft, as well as the animals. When enough gating was provided to properly protect the aircraft, the gating weighed so much that it interfered with the proper operation of the aircraft. Also, for the gating to function properly it had to be connected to the aircraft itself. This required alteration of the aircraft and was too costly to be effective.

The desire is then to provide a gating system for forming enclosed pens for holding livestock in an aircraft and especially where the pens themselves would not be connected to the aircraft and would be so designed so that they protect the aircraft from damage by the animals. The gates should also be light in weight so as to avoid adding excess weight to the aircraft and should be designed to hold the animals so securely that they are not jostled about or damaged during the aircraft's flight. The gates should also be made so that they are adjustable for different sized aircraft and so that they can be quickly and easily removed from an aircraft.

SUMMARY OF THE INVENTION

Animal pens for aircraft which consist of a plurality of panels which fit together to form enclosures for animals within the aircraft. The panels are easily and quickly assembled to conform to the shape of the aircraft and preferably do not connect to the aircraft. They are also designed to have as few crossbars as possible, especially towards the top to provide for lightness in weight. The panels (gates) are also provided adjacent the sidewalls of the aircraft to protect the aircraft and the enclosures so formed to provide for a maximum number of animals to be squeezed into an enclosure so that very little movement can take place, and, thereby, very little damage to the animals and the airplane.

BRIEF DESCRIPTION OF THE DRAWINGS

FIG. 3 is a view of the aircraft as the animals are being loaded aboard;

FIG. 4 is a view of an individual gate;

FIG. 5 is a view of the connecting areas between gates;

FIG. 6 is a cross-sectional view of the end vertical members of the gate;

FIG. 7 is a cross-sectional view of one of the intermediate vertical members of the gate;

FIG. 8 is a detailed view of one pen fully loaded; and

PREFERRED EMBODIMENT OF THE INVENTION

Figure 1:
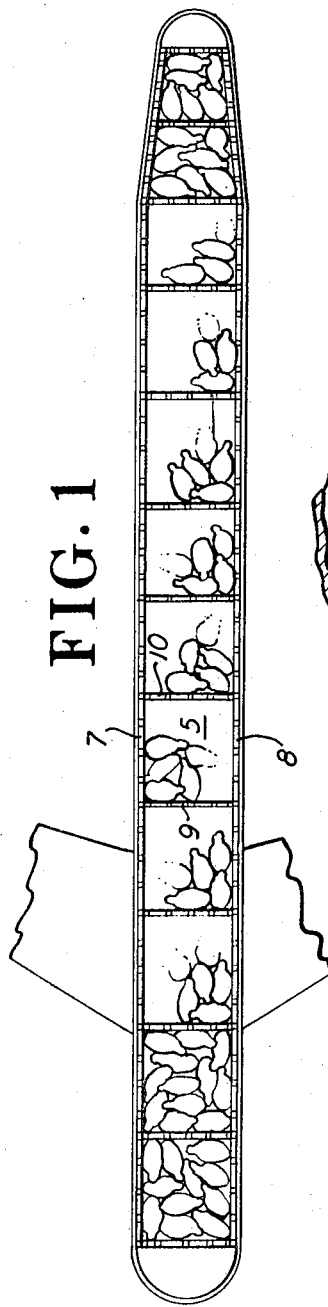
FIG. 1 shows a top view of an aircraft with the pen enclosures therein and with animals in the enclosures.

The structure of this invention includes a plurality of gating members which are adjustably connected together to form enclosures for animals in airplane. As shown in FIG. 1, which is a view of the fuselage of an aircraft, with the top removed, the gates connect together to form generally rectangular areas inside the aircraft. However, the areas may be other than rectangular to insure the maximum possible use of all available space. For example, see the two areas toward the rear of the aircraft in FIG. 1. The gates themselves, one of which is shown in FIG. 4, are placed so that each enclosure is made up of four gates, one along each sidewall of the aircraft and two movable ones which are positioned perpendicularly to form the enclosures. For example, in enclosure 5, the two sidewall gates are numbered 7 and 8. The two movable gate members are designated 9 and 10. The gate members themselves are made in varying sizes so they can conform to various aircraft. They generally consist of two outside upright members 12 and 13, and some in between upright members 14, 15, 16 and 17. It will, of course, be appreciated that depending on the size of the gate involved, the intermediate upright member may either be more or less than three in number. These uprights support a plurality of horizontally disposed tubular members 18, one of which is shown in cross section in FIG. 7. These members are spaced so they are quite close together towards the bottom of the gate as shown in FIG. 4. Generally the distance between these members is the same as the width of a member whereas towards the top of the gate they are spaced further apart. The reason for the spacing is that small animals could only escape from between the bars towards the bottom of the gate, and by having them closer together, the smaller animals are prevented from escaping. Small animals cannot, of course, reach the upper levels of the gate and, therefore, the wider spacing at the top is of no advantage to them. The larger animals, of course, cannot escape from the gate entirely, so that the large spacing at the top does not interfere with them.

Figure 2:
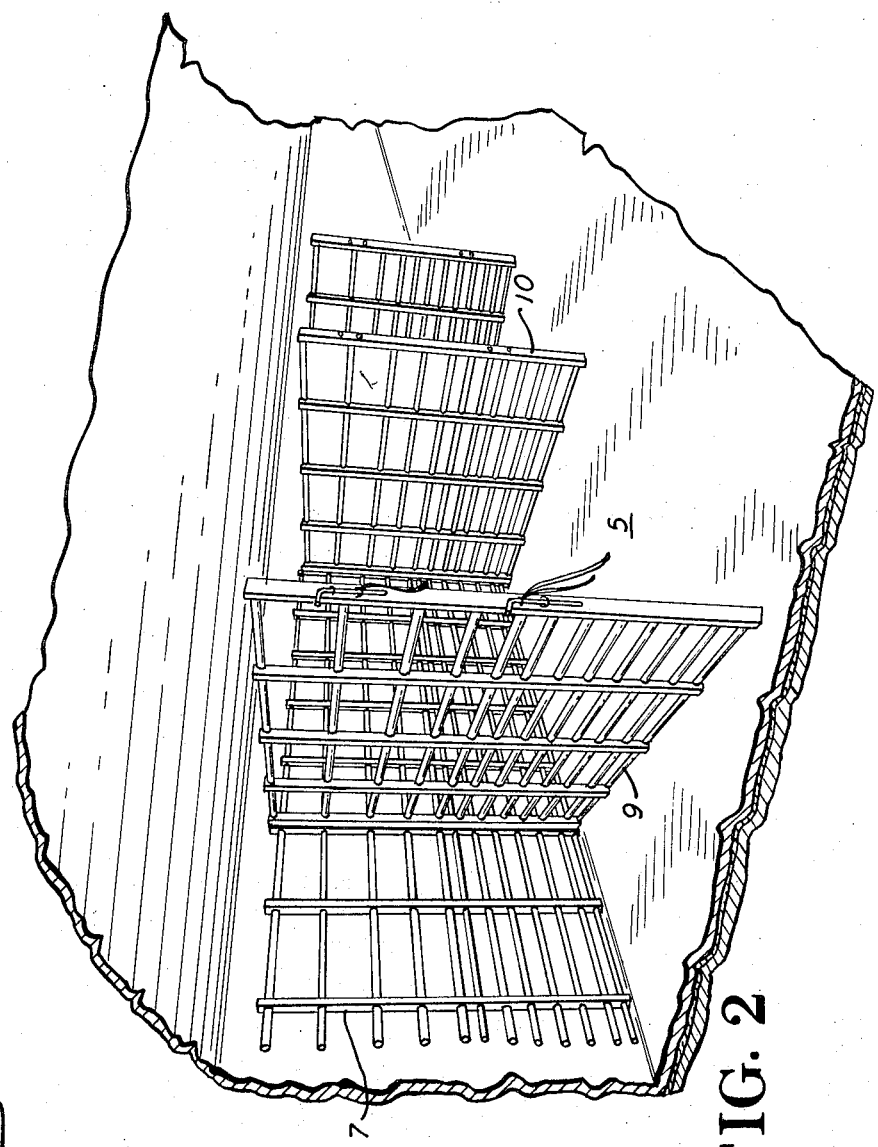
FIG. 2 is a broken-away detailed view of the aircraft showing some of the pens.
Figure 9:
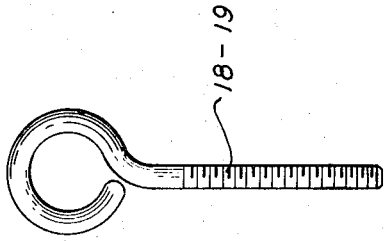
FIG. 9 is a view of a part of the connecting means.

It will be appreciated, however, by the wider spacing at the top, the entire weight of the gate is substantially reduced and thereby the load which the aircraft has to carry is reduced. The vertical members of the gate may be of many cross-sectional shapes. However, a rectangular or square cross-sectional tube seems to provide the most rigid and durable construction. These are shown in cross-sectional views in FIGS. 6 and 7, the end members being shown in FIG. 6 and the intermediate members in FIG. 7. By being square or rectangular in cross-sectional area the sidewalls of the struts are flat and thus holes can readily be drilled in them to support the horizontal cross bars. The gating sections are connected together by any suitable quick and easy fastening means. A particularly desirable one is a pin and eye arrangement shown in FIG. 8. The eye is shown in detail in FIG. 9. Two eyes 18 which are long pins having loops at the ends are connected to one member and eyes 19 are provided slightly below eyes 18 in the adjacent member. The eyes will then align and the pin member 20 can then just be slipped through the four eyes to hold the gates together. This same connection is provided at the midpoint and at the bottom of each gate as shown more clearly in FIG. 4. This connection also permits the movable gates to be rotated in and out of position. The movable gates are also connected in the same arrangement as shown in FIG. 2. The eye members for the movable gate are also connected together to the sidewall gates by means of the vertical pins 20. (See FIG. 2).

Suitable tying arrangements such as ropes are provided to tie the free ends of the movable gates 21 to the sidewall gates of the aircraft. These ties have to be strong enough to resist the stress of flight and the strength of the animals.

The bottom floor of the aircraft as shown in FIG. 2 is covered with a soft impact absorbing material such as a combination of building board-cellotex-polyethelene and felt. The polyethylene such as 0.006 mil thick polyethylene is placed along the floor to a substantial level such as inches. Then tarred felt or other absorbent material is placed over the polyethylene. Then pressed wood sheets or other strong, firm material is placed over the tarred felt. This provides a firm, strong support for the animals and at the same time adequately cushions the effect of the animals on the floor of the aircraft.

In loading the animals aboard the aircraft, for example, see FIG. 3, the gates are placed in the open position. The animals are then loaded into the first enclosure as tight as can be, in other words, as many animals as could possibly be placed in the first enclosure without injuring the animals, are placed therein. Then the movable gate to that enclosure is closed and the next enclosure is filled to its capacity with animals and then its movable gate is closed, and so on, until the entire plane is loaded with animals. In the loading procedure it is quite important that the enclosure be completely filled to capacity with animals. To aid in this, slightly more animals than fit into the enclosure can be loaded into it and then the gate closed to pack them together. This packing prevents the animals from jostling about and being injured and prevents the animals from being catapulted upwardly during the flight and injured. FIG. 8 shows the amount of animals that are loaded into a particular enclosure. It is quite important in this loading procedure that the space between animals be as small as possible. In other words, the animals should be up against one another, so that there is no leeway for the animals to move during the flight. This prevents any jostling and injury to the animals. The loading is also such that when the movable gates are swung into position, the animals are pressed slightly closer together to provide for a further packing of the animals in the enclosure. This technique of packing prevents the animals from flying upwardly and thus obviates the need for a top ceiling on the enclosures. This substantially reduces both the cost and weight of the enclosures and provides for much more efficient shipping.

It is also important that the gates be placed along the walls of the aircraft so as to prevent injury to the walls and also to provide a connection for the movable gates. By placing the gates along the walls, the movable gates can then be connected to these gates and no permanent connection need be made to the aircraft. The aircraft thus does not have to be specially adapted for use in carrying animals. The normal aircraft then can be readily adapted for carrying animals without the need to provide any hooks or other permanent structures on the aircraft. This free arrangement or nonconnection also provides for movement of the gates slightly without any structural stress on the aircraft. If the gates were directly connected to the aircraft, this might provide some undue structural stress to the aircraft during flight. This stress might tend to damage the aircraft. However, by the present arrangement where the movable gates are connected to stationary gates without any connection whatever to the aircraft, the gating can move around slightly during flight without any structural stress on the fuselage of the aircraft. The gates are also of a height as shown in FIG. 2, so that they completely cover the sidewall of the aircraft and extend up to a height greater than any of the animals can reach.

Some of the animals that can be conveniently transported by this invention are steers, hogs, sheep, goats, and other farm animals, as well as many other animals.

It will thus be appreciated that this invention provides a highly sufficient way of transporting animals by air.

It will also be appreciated that since the gates come in many sizes and shapes and are readily and easily assembled, they will fit into many different aircraft.

While a specific embodiment of the invention has been illustrated, it will be appreciated that the invention is not limited thereto, as many modifications may be made by one skilled in the art, which fall within the true spirit and scope of this invention.

What is claimed is:

1. An apparatus for transporting animals adapted to be positioned in the fuselage of an aircraft comprising:

a first panel including at least two vertical members on which are mounted a plurality of horizontally disposed members which are positioned closer together toward the bottom of said panel and further apart toward the top of said panel, said panel being positioned proximate a side wall of said aircraft, a second panel including at least two vertical members on which are mounted a plurality of horizontally disposed members which are positioned close together toward the bottom of said panel and further apart toward the top of said panel, said panel being positioned proximate a side wall of said aircraft a first moveable gate comprising at least two vertical members and a plurality of horizontally disposed members positioned therebetween, said horizontally disposed members positioned closer together toward the bottom of said gate, and further apart toward the top of said gate, said gate including interconnecting means for pivotably connecting one side thereof to said first panel and further including means for connecting the other side thereof to said panel, a second movable gate comprising at least two vertical members and a plurality of horizontally disposed members positioned therebetween said horizontally disposed members positioned closer together toward the bottom of said gate and further apart toward the top of said gate, said gate including interconnecting means for pivotably connecting one side thereof to said first panel and further including means for connecting the other side thereof to said second panel, said gating members and said panel members forming an enclosed structure adapted to be positioned in the fuselage of said aircraft without connection thereto, said gating members and said panel members extending in a vertical direction without reaching the top of said aircraft and, a flooring positioned below said gates and panels including a soft impact absorbing material covered with a firm support material.

2. The structure of claim 1 wherein both said interconnecting means comprises eyelet means fastened to each of said first and second panels and each of said first and second movable gates, said eyelet means consist of a circular member which is disposed on a long connecting member and wherein said eyelet means are connected together by means of a right angle pin which fits therethrough to interconnect said panels and gates.

3. The structure of claim 1 wherein said enclosed structure lacks a separate top, the top being the top of the fuselage of the aircraft.

* * * * *